United States Patent
Kalderen et al.

(10) Patent No.: US 11,089,516 B2
(45) Date of Patent: Aug. 10, 2021

(54) SYSTEMS AND METHODS FOR NETWORK PERFORMANCE MONITORING, EVENT DETECTION, AND REMEDIATION

(71) Applicant: Verizon Patent and Licensing Inc., Arlington, VA (US)

(72) Inventors: Bjorn Olof Erland Kalderen, South Orange, NJ (US); John P. Demko, McDonald, PA (US); Haim S. Ner, Fair Lawn, NJ (US); Feng Li, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 67 days.

(21) Appl. No.: 16/712,071

(22) Filed: Dec. 12, 2019

(65) Prior Publication Data
US 2021/0185565 A1    Jun. 17, 2021

(51) Int. Cl.
| | | |
|---|---|---|
| *H04W 28/24* | (2009.01) | |
| *H04L 12/24* | (2006.01) | |
| *H04W 24/08* | (2009.01) | |
| *H04L 12/26* | (2006.01) | |
| *H04L 12/851* | (2013.01) | |
| *H04W 28/02* | (2009.01) | |

(52) U.S. Cl.
CPC ......... *H04W 28/24* (2013.01); *H04L 41/0893* (2013.01); *H04L 41/12* (2013.01); *H04L 41/507* (2013.01); *H04L 41/5009* (2013.01); *H04L 41/5019* (2013.01); *H04L 43/0817* (2013.01); *H04L 47/2425* (2013.01); *H04L 47/2441* (2013.01); *H04L 47/2483* (2013.01); *H04W 24/08* (2013.01); *H04W 28/0268* (2013.01)

(58) Field of Classification Search
CPC . H04W 28/24; H04W 24/08; H04W 28/0268; H04L 41/0893; H04L 41/507; H04L 47/2425; H04L 43/0817; H04L 47/2441; H04L 41/12; H04L 41/5019; H04L 47/2483; H04L 41/5009
See application file for complete search history.

(56) References Cited

PUBLICATIONS

F. Siemons, "How to configure a vTAP for cloud networks," Nov. 21, 2018 (available at https://searchcloudsecurity.techtarget.com/tip/How-to-configure-a-vTAP-for-cloud-networks?vgnextfmt=print, visited Dec. 4, 2019).
(Continued)

*Primary Examiner* — Charles C Jiang
*Assistant Examiner* — Shawn D Miller

(57) ABSTRACT

A system described herein may provide a technique for selecting and configuring a capture component and a filtering and analysis component for traffic capture in a manner that suitably accounts for Service Level Agreements ("SLAs") of traffic to be captured. A traffic capture request may indicate one or more SLAs and/or other attributes, and an orchestration system may identify a network function (such as a User Plane Function ("UPF") of a wireless network) that handles traffic that includes the requested traffic and instantiate the capture component at a node that implements the network function. The orchestration system may select a node, from a cluster of nodes, that is able to filter and analyze the traffic in an expedient manner in accordance with SLA(s) associated with the requested traffic, and install the filtering and analysis component at the selected node.

20 Claims, 12 Drawing Sheets

(56) References Cited

PUBLICATIONS

Netscout, "vBroker 120—64G Modular 1G/10G Network Packet Broker," Feb. 2018 (available at https://www.netscout.com/sites/default/files/2018-02/NETSCOUT_QL_vBroker_120-64G_Modular.pdf, visited Dec. 4, 2019).

Kubernetes, "Cluster Administration Overview," Linux Foundation, 2019 (available at https://kubernetes.io/docs/concepts/cluster-administration/cluster-administration-overview/, visited Nov. 29, 2019).

Kubernetes, "Concepts Underlying the Cloud Controller Manager," Linux Foundation, 2019 (available at https://kubernetes.io/docs/concepts/architecture/cloud-controller/, visited Nov. 29, 2019).

Kubernetes, "Controllers," Linux Foundation, 2019 (available at https://kubernetes.io/docs/concepts/architecture/controller/, visited Nov. 29, 2019).

Kubernetes, "Kubernetes Components," Linux Foundation, 2019 (available at https://kubernetes.io/docs/concepts/overview/components/, visited Nov. 29, 2019).

Kubernetes, "Master-Node Communication," Linux Foundation, 2019 (available at https://kubernetes.io/docs/concepts/architecture/master-node-communication/, visited Nov. 29, 2019).

Kubernetes, "Nodes," Linux Foundation, 2019 (available at https://kubernetes.io/docs/concepts/architecture/nodes/, visited Nov. 29, 2019).

Kubernetes, "The Kubernetes API," Linux Foundation, 2019 (available at https://kubernetes.io/docs/concepts/overview/kubernetes-api/, visited Nov. 29, 2019).

Kubernetes, "What is Kubernetes," Linux Foundation, 2019 (available at https://kubernetes.io/docs/concepts/overview/what-is-kubernetes/, visited Nov. 29, 2019).

Extreme Networks, Inc., "Extreme Virtual Packet Broker and Virtual TAP," Extreme Customer-Driven Networking Data Sheet, 2019 (available at https://cloud.kapostcontent.net/pub/a3d0c797-8f35-4b28-ad46-759a60536f3c/virtual-packet-broker-data-sheet.pdf?kui=a-UzSqK7WpGirbtH-bdfKA, visited Dec. 4, 2019).

Wikipedia, "Network tap," Wikimedia Foundation, Inc., Nov. 27, 2019 (available at https://en.wikipedia.org/w/index.php?title=Network_tap&oldid=928187271, visited Dec. 4, 2019).

SYSTEMS AND METHODS FOR NETWORK PERFORMANCE MONITORING, EVENT DETECTION, AND REMEDIATION

BACKGROUND

Networks, such as wireless networks, may utilize a Software-Defined Network ("SDN") architecture, in which some or all components or functions of the network are implemented by "cloud" systems, virtual machines, or the like. Users and/or devices that utilize such networks may be associated with Service Level Agreements ("SLAs"), which may define minimum performance thresholds for traffic associated with the users and/or devices (e.g., thresholds relating to latency throughout, and/or other measures of performance).

DETAILED DESCRIPTION OF THE PREFERRED EMBODIMENTS

Figure 1A:
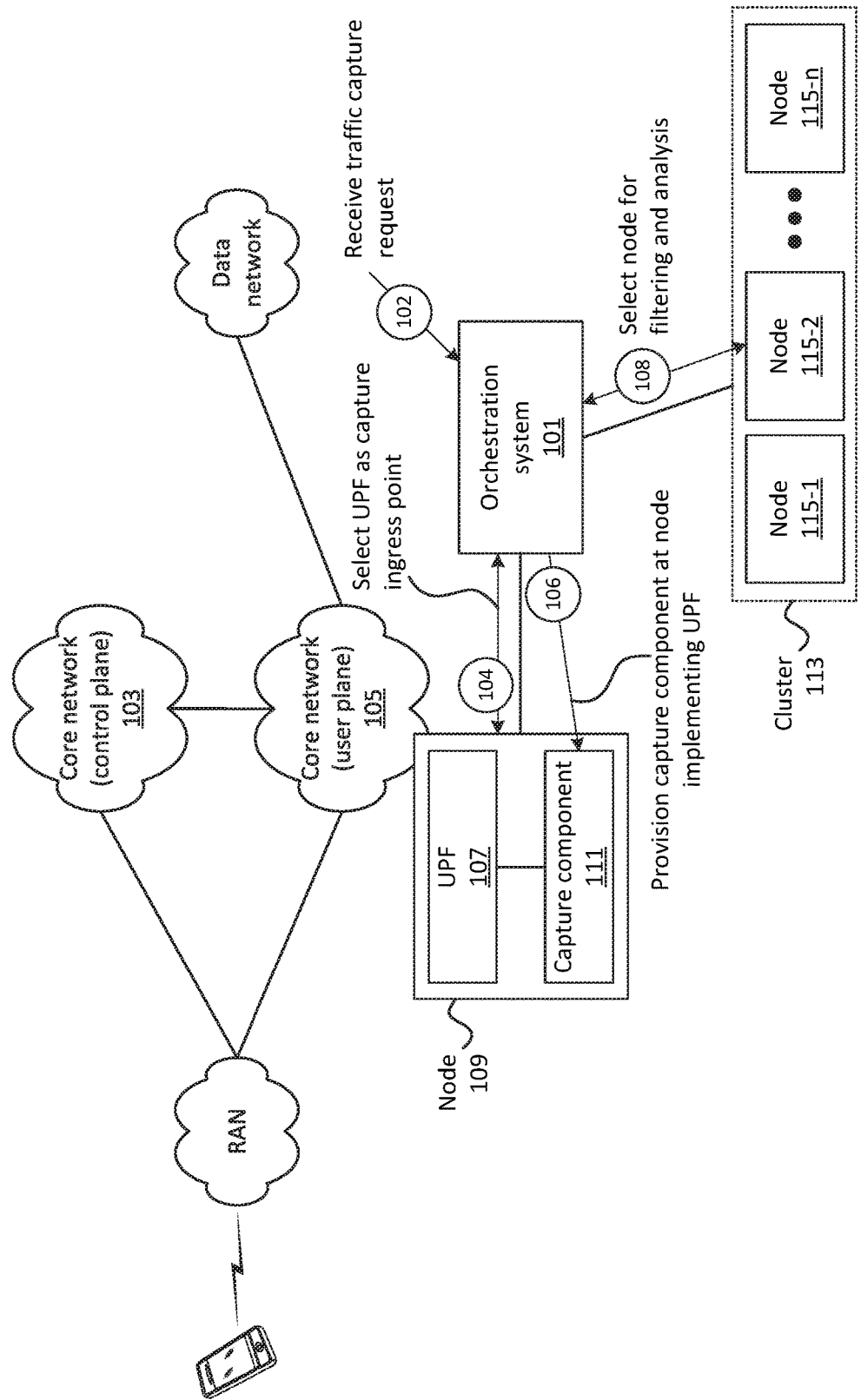
FIGS. 1A-1C illustrate an example overview of one or more embodiments described herein, in which one or more elements of a network (and/or other resources) may be selected for capture and/or analysis of traffic for performance monitoring, event detection, and remediation of detected events.

The following detailed description refers to the accompanying drawings. The same reference numbers in different drawings may identify the same or similar elements.

Embodiments described herein provide for the monitoring of performance of one or more elements of a network, in order to determine whether one or more Service Level Agreements ("SLAs") are met by the network. Further, as described herein, the monitoring may indicate network events and/or failure to meet one or more SLAs. In accordance with some embodiments described herein, the one or more elements of the network, at which to monitor the performance, may be selected based on attributes of the SLA(s) to be evaluated, load and/or capacity of the one or more elements, estimated or calculated resource usage associated with links between different elements that perform the monitoring of traffic or the analysis of the traffic, and/or other factors.

For example, as shown in FIG. 1, orchestration system 101 may receive a request to capture and analyze certain traffic associated with a network (e.g., a wireless telecommunications network, such as an Long-Term Evolution ("LTE") network, a Fifth Generation ("5G") network, or the like). For example, the request may indicate a particular User Equipment ("UE"), a particular application or service type (e.g., voice, data, streaming content, etc.), and/or other criteria.

As shown, the network may include a radio access network ("RAN"), which may provide wireless connectivity to one or more UEs. The network may also include a core network, which may be arranged as control plane portion 103 and user plane portion 105. While portions 103 and 105 are described in greater detail below, generally speaking, user plane traffic may be handled by user plane portion 105, which may include one or more gateways or interfaces (e.g., User Plane Function ("UPF") 107) that facilitate the transmission of traffic between the RAN and a Data Network ("DN"), such as the Internet.

As discussed herein, UPF 107 (and/or other components or functions of the network) may be implemented by one or more nodes. A "node," as discussed herein, may refer to a distributed system, a "cloud" device, and/or some other designation of a set of hardware or virtualized resources (e.g., processor resources, memory resources, storage resources, and/or other resources). A particular node may be implemented by multiple hardware devices (e.g., server devices and/or some other type of device), which may be co-located and/or may be located in geographically distinct locations. Orchestration system 101 may provision virtual machines and/or other virtual functions on a node (e.g., orchestration system 101 and one or more nodes may implement an application programming interface ("API") that allows for orchestration system 101 to provision resources of the nodes for virtual machines and/or virtual functions). One such API to allow for the provisioning of virtual functionalities on a node is the Kubernetes API.

In some embodiments, as shown in FIG. 1A, orchestration system 101 may receive (at 102) a traffic capture request (e.g., based on an automated network diagnostic process, based on manual requests from a network administrator, based on authorized requests from a network subscriber, etc.). The traffic capture request may specify the capture of a certain type of traffic (e.g., voice traffic, data traffic, etc.), capture of traffic associated with a particular subscriber or device (or group of subscribers or devices), and/or having other distinguishing factors. In some embodiments, the traffic capture request may indicate one or more SLAs associated with the requested traffic. Additionally, or alternatively, orchestration system 101 may identify one or more SLAs associated with the requested traffic, even if not specifically indicated in the request. As one example, orchestration system 101 may communicate with one or more components of control plane portion 103, such as a Unified Data Management function ("UDM"), a Home Subscriber Server ("HSS"), etc., to identify one or more SLAs associated with the requested traffic.

Traffic capture requests may be costly in terms of amounts of network and/or processor resources needed to capture traffic. For example, as discussed herein, a particular network device may be "tapped," in which all of the network traffic that is handled by (e.g., sent and/or received by) the network device may be replicated, logged, transmitted, etc., and analyzed and/or filtered in order to identify the desired traffic (e.g., the traffic that is the subject of the traffic capture request). In many situations, because the desired traffic is a relatively small portion of the entire set of traffic handled by the network device, the filtering and analysis of the traffic may be necessary to obtain the desired traffic. Further, because the tapping of a network device causes all of the traffic handled by the device to be replicated, logged, transmitted, etc., orchestration system 101, in some embodiments, may select a particular network device or function (e.g., as opposed to other network devices or functions) to tap in response to the traffic capture request.

As described in greater detail below, the selection of a particular network device or function (referred to herein as "network function," which may refer to a network function provisioned at and implemented by a particular node) from a set of candidate network functions, may be based on one or more factors. The factors may include, for example, performance and/or load of the candidate network functions, performance and/or load of nodes that implement the network functions, performance requirements associated with the SLA(s) of the traffic, and/or other factors. In this example, assume that orchestration system 101 has selected (at 104) a particular UPF 107 (e.g., which is part of user plane portion 105) as a capture ingress point (e.g., has selected to "tap" UPF 107). In some embodiments, control plane portion 103 and/or user plane portion 105 may include multiple "slices" (e.g., instances of control plane portion 103 and/or user plane portion 105, in which different slices provide differentiated service, such as meeting different sets of SLAs). Selecting UPF 107 may include identifying a particular slice of user plane portion 105 based on the SLA(s) associated with the traffic capture request (e.g., different slices of user plane portion 105 may be mapped to, and/or otherwise associated with, different SLAs).

As shown, selected UPF 107 may be implemented on node 109. Based on the selection of UPF 107, orchestration system 101 may provision (at 106) capture component 111 at node 109. For example, orchestration system 101 may issue an instruction to node 109 to instantiate (e.g., install an instance of) a virtual "container," virtual machine, virtual image, and/or other suitable function, that implements capture component 111. In some embodiments, capture component 111 may be and/or may include a virtual Terminal Access Point ("vTAP"). Provisioning (at 106) capture component 111 may also include instructing UPF 107 to communicate with capture component 111 in order to provide all traffic (e.g., a copy of all traffic) handled by UPF 107 to capture component 111.

Orchestration system 101 may further select a particular node to implement a filtering and analysis component ("FAC") 117 to receive the captured traffic and identify the requested traffic. In some embodiments, FAC 117 may include a virtual broker ("vBroker"), which may receive and aggregate traffic from multiple different sources (e.g., multiple vTAPs). Accordingly, while described in the context of the provisioning of one capture component 111, embodiments herein may use similar concepts to capture traffic from multiple sources (e.g., from multiple capture components 111 installed at multiple network devices or systems), and FAC 117 may receive (e.g., broker) the traffic from the multiple sources. Furthermore, concepts relating to filtering and/or analyzing the traffic, as described herein, may be performed on brokered traffic (e.g., traffic aggregated from multiple sources).

Orchestration system 101 may be communicatively coupled to a cluster 113 of nodes 115-1 through 115-n (referred to individually as "node 115," or in plural as "nodes 115"). Nodes 115 of cluster 113 may each have discrete resources. For example, node 115-1 may have its own set of processor and storage resources as compared to the processor and storage resources of node 115-2. Nodes 115 may have different attributes and/or characteristics (e.g., node 115-1 may have greater processor, memory, and/or storage resources than 115-2), or in some scenarios may have one or more same attributes and/or characteristics.

Orchestration system 101 may select (at 108) a particular node (i.e., node 115-2, in this example) of cluster 113 based on one or more factors. For example, as discussed in greater detail below, orchestration system 101 may select (at 108) node 115-2 based on physical distance between nodes 115 and node 109 (e.g., the node implementing capture component 111), performance metrics (e.g., latency, throughput, etc.) of communications between nodes 115 and node 109, network topology between nodes 115 and node 109, load and/or capacity of nodes 115, characteristics of one or more SLA(s) of requested traffic, and/or other factors. As one example, if a given SLA associated with requested traffic indicates a relatively low latency, orchestration system 101 may select a particular node 115 with a relatively high amount of resources (e.g., relatively greater processing, memory, and/or storage resources), a relatively low load, and/or with relatively high performance of communication (e.g., low latency, high throughput, etc.) between the particular node 115 and node 109. In contrast, if a given SLA associated requested traffic does not indicate a relatively low latency, orchestration system 101 may weigh these factors less heavily when selecting a particular node 115. In this manner, performance issues associated with SLAs specifying low latencies may be more expediently identified by a particular node 115 with relatively greater resources and/or capability than other nodes 115, thus allowing for such issues to be remedied on an expedient basis.

Figure 1B:
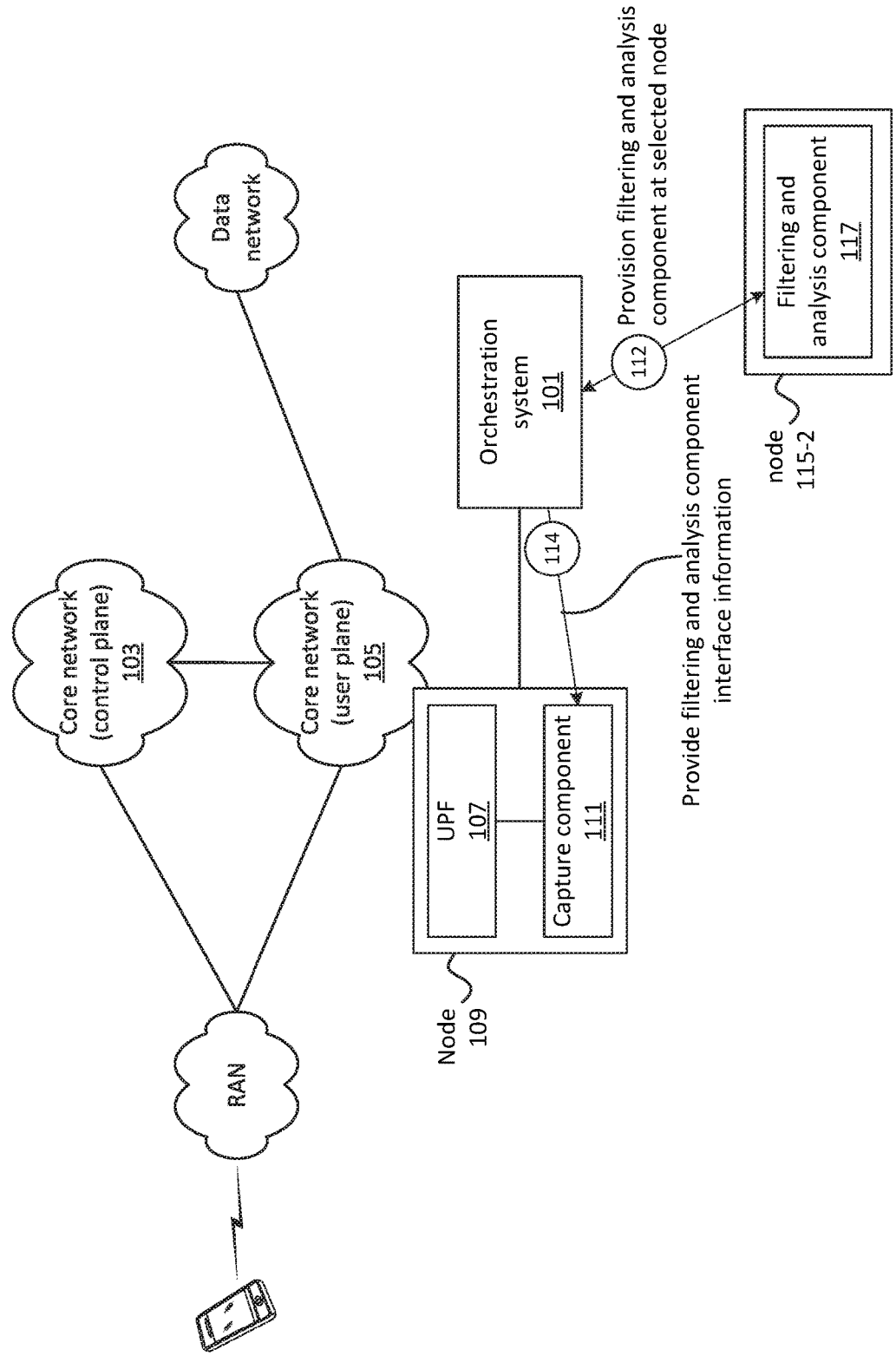

As shown in FIG. 1B, orchestration system 101 may provision (at 112) FAC 117 at selected node 115-2. For example, orchestration system 101 may cause a container, virtual machine, etc., to be instantiated at node 115-2, which implements FAC 117. In some embodiments, orchestration system 101 may instantiate some portions of the functionality of FAC 117 at node 115-2, while instantiating other portions of the functionality of FAC 117 at one or more other nodes 115. For example, orchestration system 101 may select a first node 115 to perform filtering of traffic by FAC 117, while selecting one or more other nodes 115 to analyze the filtered traffic (e.g., identify network events or other conditions, and/or identify remediation measures for identified network events). While described herein in the context of selecting one node 115 for instantiating FAC 117, similar concepts may be used to select multiple nodes 115 to instantiate different portions of FAC 117.

Orchestration system 101 may provide (at 114) interface information, associated with selected node 115-2, to capture component 111. The interface information may include, for example, an Internet Protocol ("IP") address, a Uniform Resource Locator ("URL"), and/or some other identifier of node 115-2 (e.g., an identifier that uniquely differentiates node 115-2 from other nodes 115).

Additionally, or alternatively, orchestration system 101 may provide, to capture component 111, an identifier associated with cluster 113 (e.g., an identifier of a "master" node 115 of cluster 113), and may also provide cluster 113 (e.g., may provide to the "master" node 115) mapping information (or other suitable information), indicating that traffic received from UPF 107 should be provided to node 115-2 (e.g., not to other nodes 115 of cluster 113).

Figure 1C:
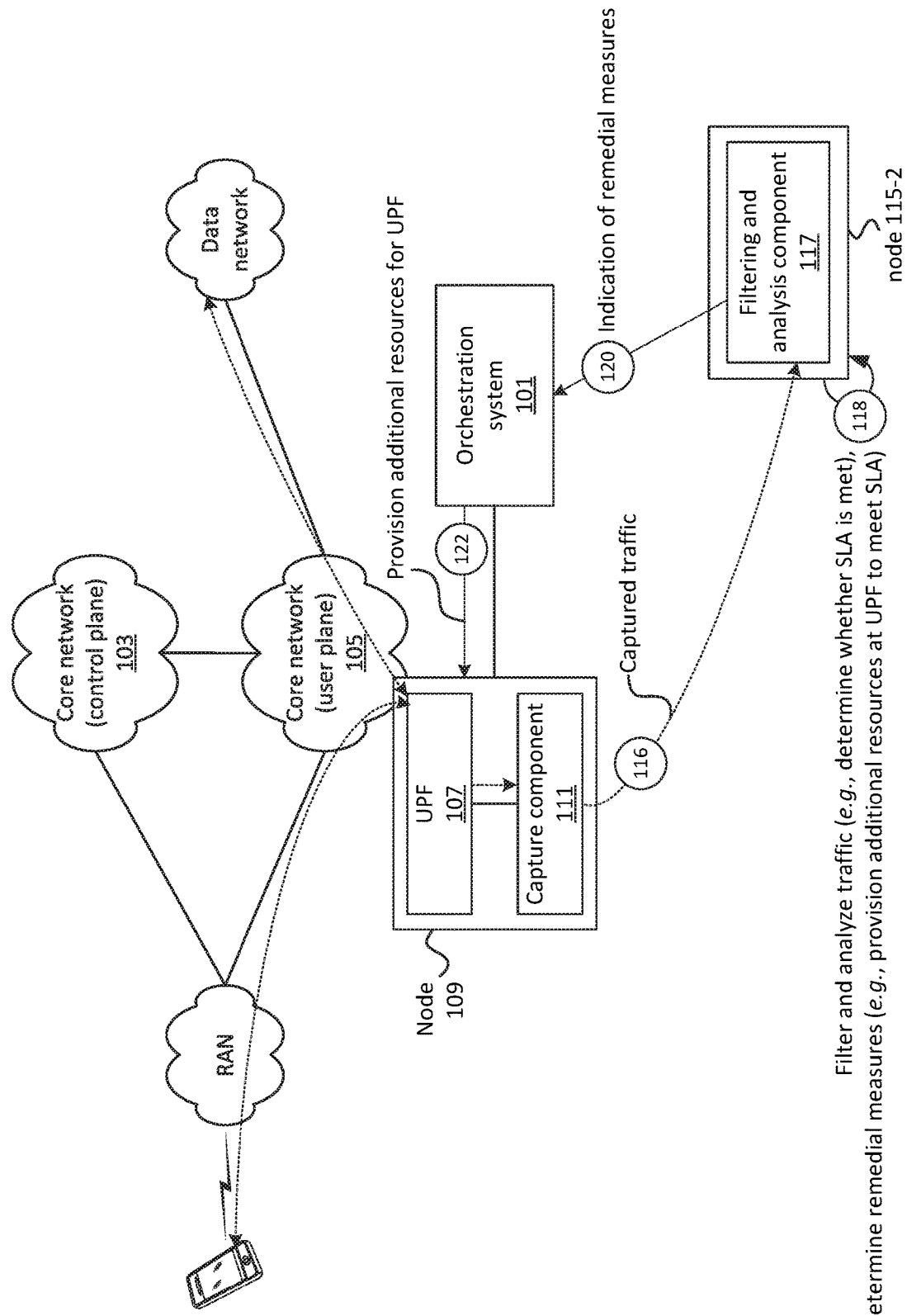

As shown in FIG. 1C, capture component 111 may receive traffic from UPF 107 (as denoted by the dashed lines). As mentioned above, the traffic received from UPF 107 may be all traffic sent and/or received by UPF 107. Based on the provided interface information, capture component 111 may output (at 116) the captured traffic to FAC 117. In accordance with some embodiments, FAC 117 may filter (at 118) the traffic to identify the requested traffic (e.g., the traffic matching criteria specified in the capture request). For example, FAC 117 may identify traffic that is associated with a particular subscriber or set of subscribers, traffic of a given type, etc.

In some embodiments, FAC 117 may perform further analysis of the filtered traffic in order to identify network events, and may further initiate the remediation of such events. For example, FAC 117 may identify, by analyzing the traffic, whether one or more SLAs are being met. For instance, based on the analysis of the traffic, FAC 117 may identify that traffic associated with an SLA specifying a maximum latency is exhibiting a higher latency than is specified in the SLA. Based on identifying this SLA not being met, FAC 117 may identify (e.g., based on machine learning techniques, by using a mapping of types of network events to options for remedial measures, etc.) one or more remedial measures to take. For instance, FAC 117 may determine that additional resources should be provisioned at 109 for UPF 107. FAC 117 may output (at 120) an indication of the determined remedial measure(s), and/or may otherwise indicate that one or more SLAs are not being met. Orchestration system 101 may accordingly provision (at 122) additional resources of node 109 for UPF 107.

FIGS. 2-6B illustrate example factors that may be used by orchestration system 101 in selecting a particular node 115 on which to provision FAC 117. The example factors shown in these figures may not be an exhaustive list. That is, in practice, similar and/or different factors from those shown in these examples may be used. Further, the concepts shown in these figures may be used individually and/or in combination in some embodiments.

Figure 2:
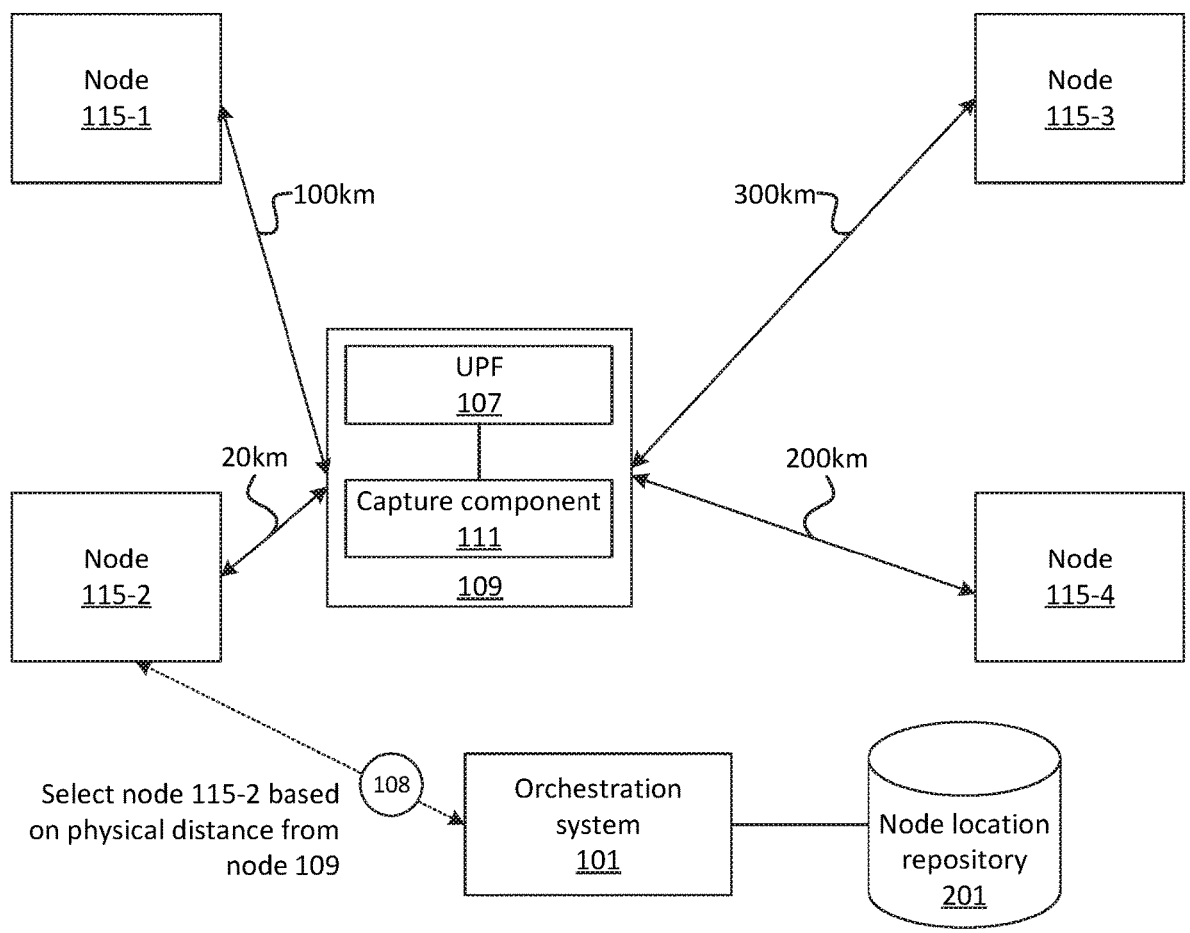
FIG. 2 illustrates an example selection of a node, from a cluster of candidate nodes, to host a filtering and analysis component ("FAC"), in accordance with some embodiments, based on physical distance from a node that hosts a capture component.

As shown in FIG. 2, for example, orchestration system 101 may select node 115 based on physical distance from node 109. For example, each node 115 (e.g., each node 115 associated with cluster 113) and node 109 may be associated with a particular geographical location or region. Orchestration system 101 may include, and/or may be communicatively coupled with, node location repository 201, which may store information indicating geographical locations and/or regions associated with nodes 115 and/or node 109. Node location repository 201 may receive the information indicating the geographical locations and/or regions associated with nodes 115 and/or node 109 during a registration, provisioning, setup, and/or update process associated with nodes 115 and/or node 109.

In this example, the location information from node location repository 201 may indicate that node 115-1 is 100 km away from node 109, that node 115-2 is 20 km away from node 109, that node 115-3 is 300 km away from node 109, and that node 115-4 is 200 km away from node 109. In this example, orchestration system 101 may select node 115-2 based on its distance from node 109. For instance, orchestration system 101 may select (at 108, referring to the selection shown in FIG. 1A) node 115-2 because node 115-2 is the particular node 115 out of cluster 113 that is geographically closest to node 109.

Figure 3:
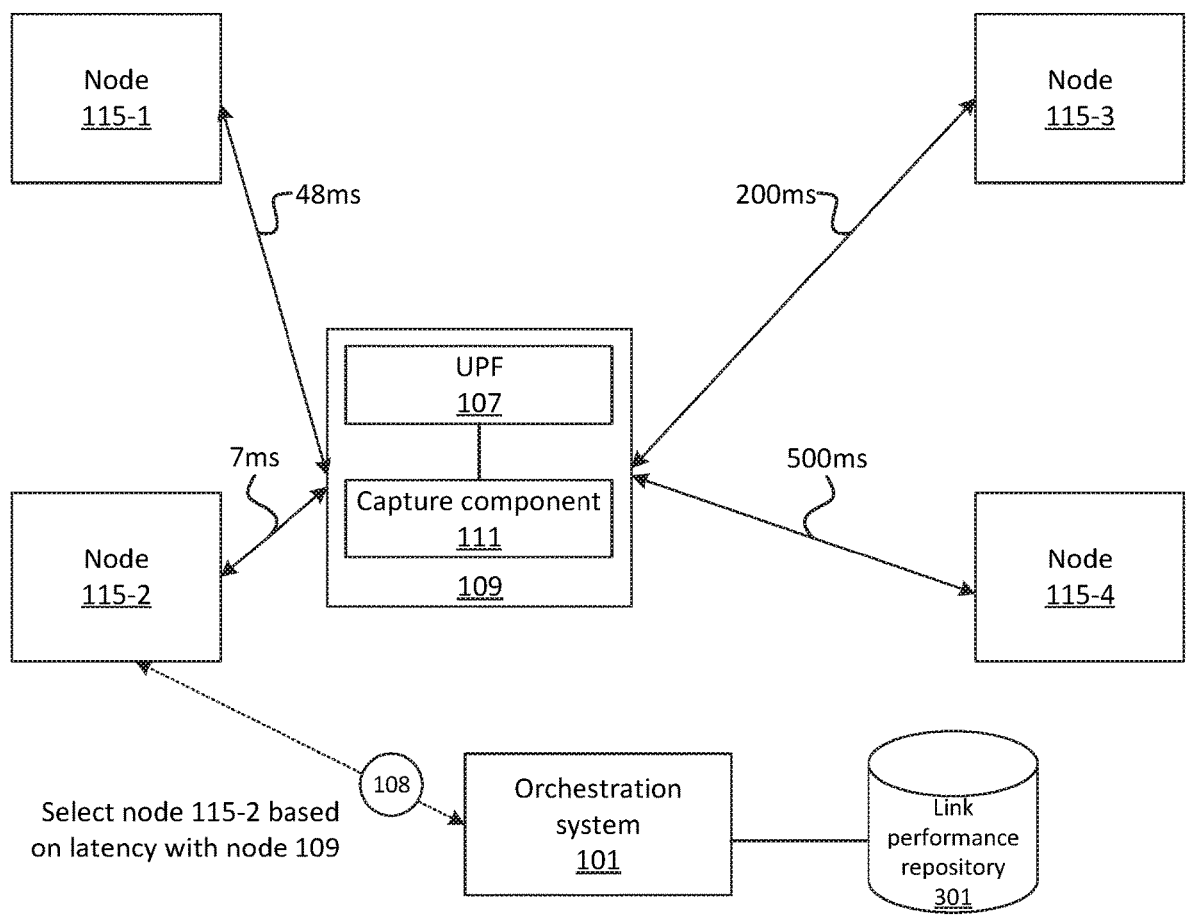
FIG. 3 illustrates an example selection of a node to host a FAC, in accordance with some embodiments, based on link performance between the node and a node that hosts a capture component.

As shown in FIG. 3, orchestration system 101 may select a particular node 115 based on performance metrics associated with communications between nodes 115 of cluster 113 and node 109. In this example, performance is exemplified by measures of latency. In some embodiments, latency and/or other metrics may be used to determine or indicate performance. For example, throughput, jitter, error rate, loss rate, retransmission rate, and/or other metrics may be used to determine or indicate performance.

Orchestration system 101 may include, and/or may be communicatively coupled with, link performance repository 301. Link performance repository 301 may receive performance information from a device or system that determines and/or monitors performance associated with communication links between node 109 and one or more nodes 115. For example, link performance repository 301 may include, and/or may be communicatively coupled with, a device or system that causes node 109 to perform performance diagnostics, such as sending traffic to individual nodes 115 and determine performance metrics (e.g., round trip delay and/or latency, error rate, jitter, throughput, etc.) associated with the traffic. Additionally, or alternatively, link performance repository 301 may include, and/or be communicatively coupled with, a device or system that causes orchestration system 101, node 115, etc. to determine the performance metrics.

In this example, the performance information from link performance repository 301 may indicate that traffic between node 115-1 and node 109 exhibits 48 ms of latency, that traffic between node 115-2 and node 109 exhibits 7 ms of latency, that traffic between node 115-3 and node 109 exhibits 200 ms of latency, and that traffic between node 115-4 and node 109 exhibits 500 ms of latency. Accordingly, orchestration system 101 may select (at 108) node 115-2 based on performance of its link with node 109. For instance, orchestration system 101 may select node 115-2 because node 115-2 exhibits the lowest latency, with respect to node 109, out of cluster 113.

Figure 4:
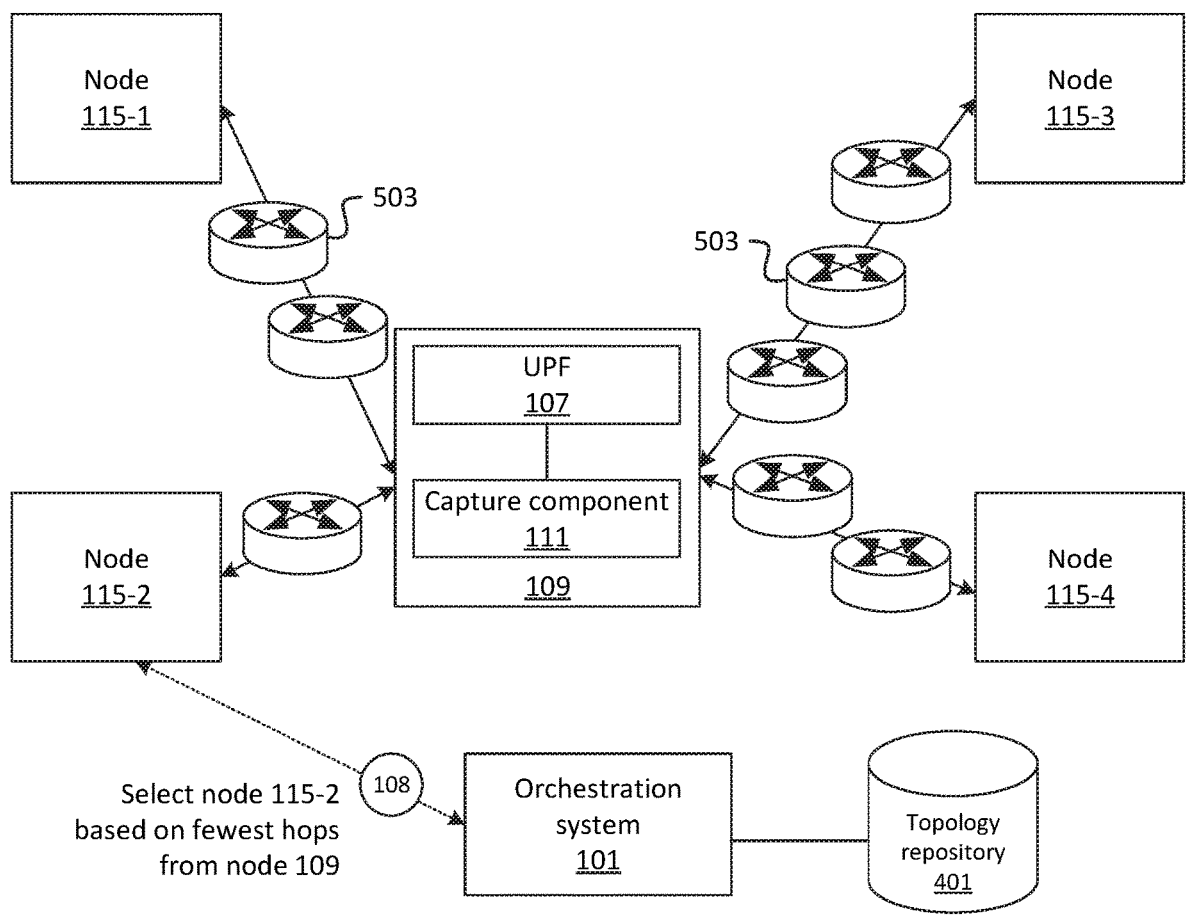
FIG. 4 illustrates an example selection of a node to host a FAC, in accordance with some embodiments, based on topology of a network that includes links between the node and a node that hosts a capture component.

As shown in FIG. 4, orchestration system 101 may select a particular node 115 based on network topology associated with node 109 and nodes 115 of cluster 113. "Topology" of the network may refer to or otherwise reflect, for instance, network devices, hubs, switches, routers, etc., through which traffic between node 109 and nodes 115 traverses. In this figure, the presence of a particular network device, hub, switch, router, etc., is denoted by an instance of router 503. The traversal of a particular router 503 may be considered as a "hop." Orchestration system 101 may include, and/or may be communicatively coupled with, topology repository 401. Topology repository 401 may receive topology information as part of a configuration, provisioning, setup, etc. procedure associated with routers 503, nodes 115, node 109, etc. Additionally, or alternatively, topology repository 401 may include and/or may be communicatively coupled to a device or system that performs a traceroute and/or other suitable diagnostic procedures to determine the network topology (e.g., presence of routers 503).

In this example, the topology information from topology repository 401 may indicate two hops between node 115-1 and node 109, one hop between node 115-2 and node 109, three hops between node 115-3 and node 109, and two hops between node 115-4 and node 109. Accordingly, orchestration system 101 may select (at 108) node 115-2 based on the network topology. For instance, orchestration system 101 may select node 115-2 because node 115-2 and node 109 have the fewest hops between them, out of the hops between nodes 115 (of cluster 113) and node 109.

Figure 5:
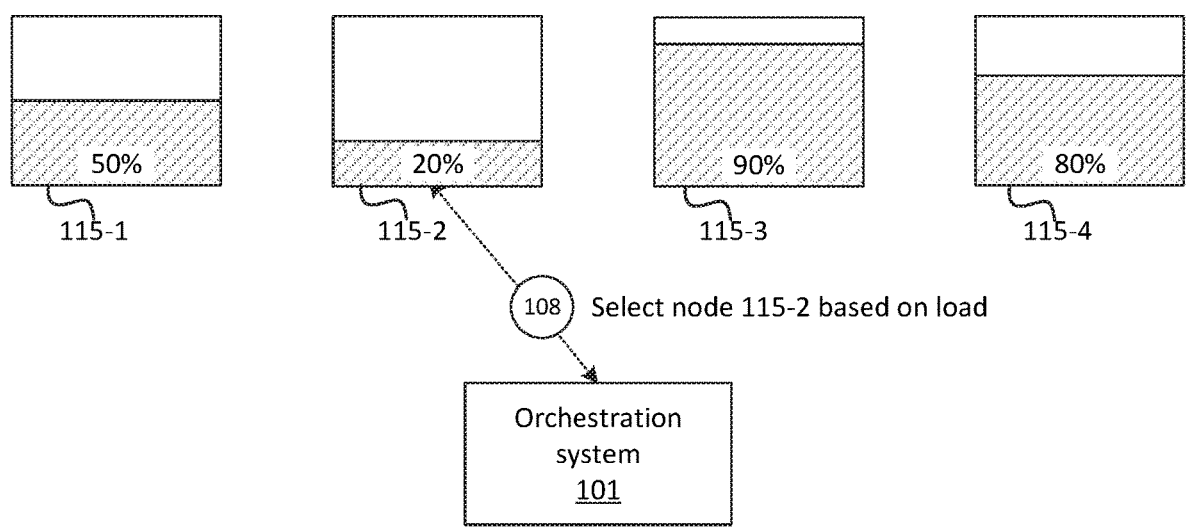
FIG. 5 illustrates an example selection of a node to host a FAC, in accordance with some embodiments, based on load metrics associated with the node.

As shown in FIG. 5, orchestration system 101 may select a particular node 115 based on measures of load and/or capacity associated with nodes 115 of cluster 113. Orchestration system 101 may, in some embodiments, receive load and/or capacity information from nodes 115. For example, nodes 115 may include and/or implement functionality that monitors load and/or capacity of nodes 115 and reports the monitored load and/or capacity to orchestration system 101. In some embodiments, this monitoring and reporting may be performed on an ongoing, periodic, and/or intermittent basis. The reporting may be done based on requests from orchestration system 101, and/or may be "pushed" to orchestration system 101 (e.g., independent of whether requests were received from orchestration system 101).

"Load" of a particular node 115 may refer to a quantity or proportion of resources, associated with node 115, that are used and/or are otherwise unavailable. Load may be indicated for each of a group of different types of resources, such as processor resource load, storage resource load, memory resource load, etc. In some embodiments, multiple different types of load may be combined to form a composite or overall load metric or score. For example, a particular node 115 that has a processor load of 20% and a memory load of 30% may be associated with an overall load metric that is based on these two different measures of load (e.g., an overall load metric of 25%).

In this example, node 115-1 may be 50% loaded (e.g., an overall load metric associated with node 115-1 may be 50%), node 115-2 may be 20% loaded, node 115-3 may be 90% loaded, and node 115-4 may be 80% loaded. Accordingly, orchestration system 101 may select (at 108) node 115-2 based on the load metrics associated with node 115-2. For instance, orchestration system 101 may select node 115-2 because node 115-2 has the lowest measure of load of nodes 115 of cluster 113.

Figure 6A:
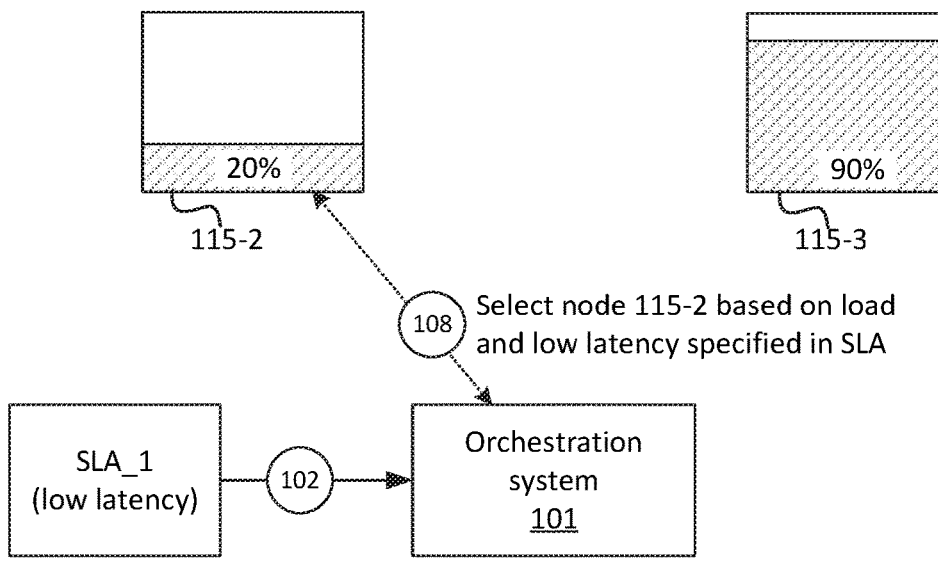
FIGS. 6A and 6B illustrate examples of selecting a node based on a Service Level Agreement ("SLA") to be evaluated.
Figure 6B:
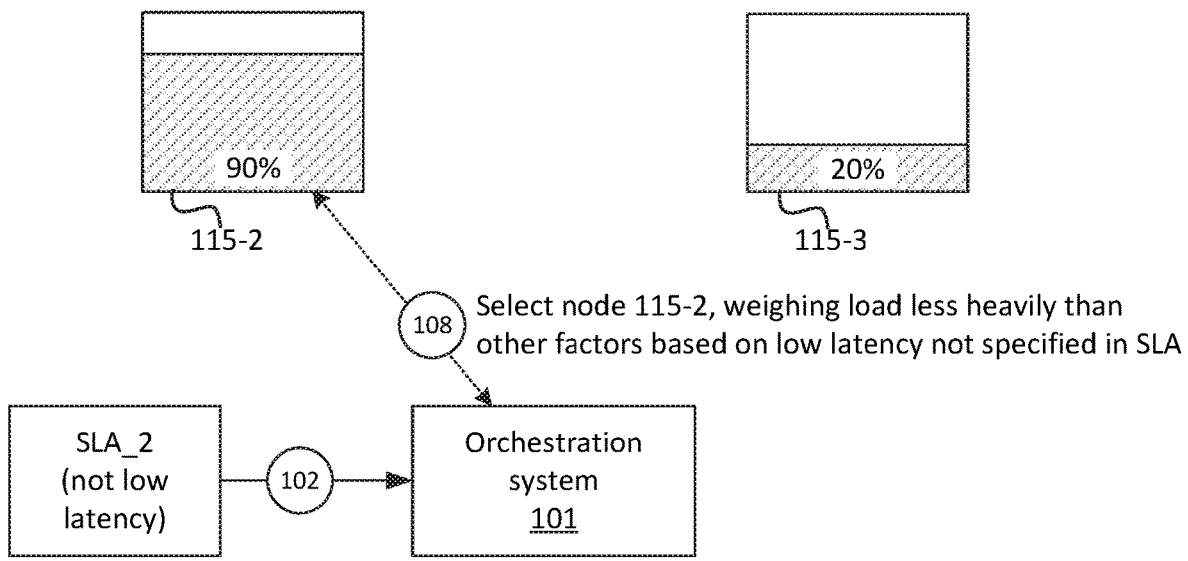

As shown in FIGS. 6A and 6B, the selection of a particular node 115, on which to provision FAC 117, may further be based on an SLA indicated in a traffic capture request. For example, as discussed above, a traffic capture request 102 may indicate, and/or may otherwise be associated with, one or more SLAs. Generally speaking, when provisioning FAC 117 to analyze traffic associated with more performance-intensive SLAs (e.g., SLAs that indicate a low latency, high throughput, etc.), orchestration system 101 may more heavily weight factors that would lead to faster filtering and analysis of captured traffic, because delays in remediating network conditions for such SLAs may be more impactful than delays in remediating network conditions for SLAs with less stringent performance requirements.

FIGS. 6A and 6B illustrate different scenarios, in which node 115-2 may be selected (at 108) for implementing FAC 117. In FIG. 6A, node 115-2 may be associated with a relatively low measure of load (20%), while node 115-3 (i.e., another candidate node 115 in cluster 113) may be associated with a relatively high measure of load (90%). Further, in FIG. 6A, the SLA ("SLA_1") specified in capture request 102 may indicate a relatively low latency.

On the other hand, in FIG. 6B, node 115-2 may be associated with a relatively high measure of load (90%), while node 115-3 may be associated with a relatively low measure of load (20%). In FIG. 6B, the SLA specified in capture request 102 ("SLA_2") may indicate a relatively high latency (e.g., is a less stringent SLA than SLA_1 of FIG. 6A).

In FIG. 6A, orchestration system 101 may select (at 108) node 115-2 based on the relatively low load associated with node 115-2, and based on the low latency specified in SLA_1. For example, the relatively high load associated with node 115-3 may be greater than a threshold measure of load for the latency associated with SLA_1, and/or orchestration system 101 may select node 115-2 because the load associated with node 115-2 is lower than the load associated with node 115-3. In some embodiments, orchestration system 101 may weight some factors (e.g., load, link performance, network topology, geographical distance, etc.) more heavily than others when selecting node 115, based on performance specified in an SLA associated with requested traffic to be captured. For example, orchestration system 101 may weight load and/or other factors (e.g., link performance) more heavily than one or more other factors (e.g., geographical distance, number of hops, etc.) based on the relatively low latency specified in SLA_1.

On the other hand, in FIG. 6B, orchestration system 101 may select (at 108) node 115-2 based on one or more other factors, other than load associated with nodes 115 of cluster 113 (e.g., based on factors other than the loads associated with node 115-2 and node 115-3). That is, even though node 115-2 is more loaded than node 115-3, node 115-2 may still be selected, by orchestration system 101, to implement FAC 117 based on one or more other factors. For example, since SLA_2 indicates a relatively higher latency than SLA_1 (and/or does not indicate a specified latency), load of node 115-2 may be less of a factor (and/or may not be a factor) in the example of FIG. 6B, in contrast with the example of FIG. 6A. In this example, for instance, network topology, geographical distance, etc. may be weighed relatively more heavily than load or link performance than in the example of FIG. 6A.

While FIGS. 6A and 6B are discussed in terms of "load" being a factor that may be weighted differently based on different SLAs, in practice, one or more other factors (e.g., in addition to, or in lieu of, load) may be weighted differently based on different SLAs. For example, in some embodiments, topology, geographical distance, link performance, and/or other factors may be weighted more or less heavily based on performance requirements specified in requested SLAs. Further, while overall load is discussed here, one or more particular metrics associated with load may be evaluated and/or weighted more heavily than other metrics associated with load (e.g., processor load may be weighted more heavily than storage load, as one example).

Figure 7:
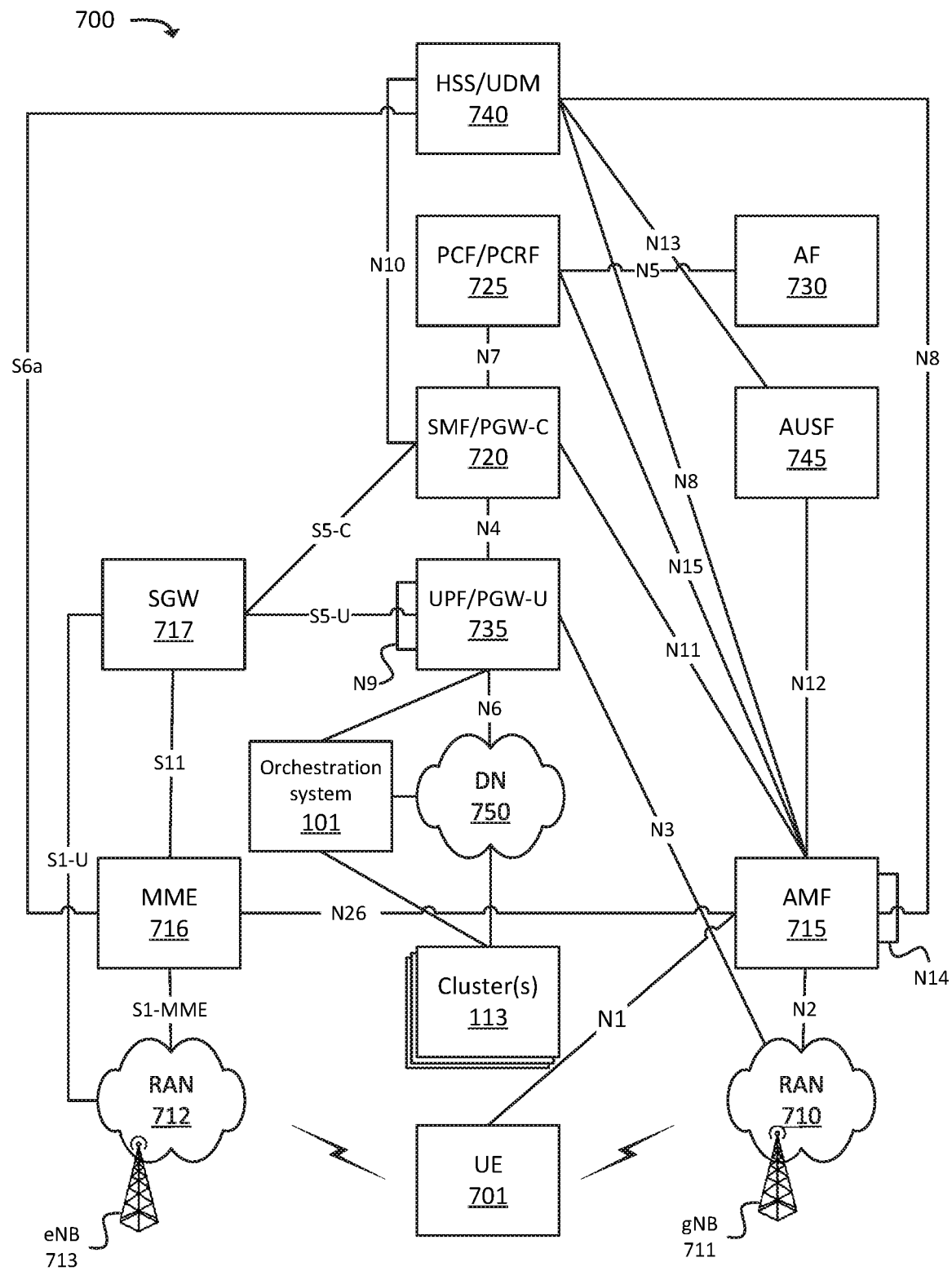
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), Access and Mobility Management Function ("AMF") 715, Session Management Function ("SMF")/

Packet Data Network ("PDN") Gateway ("PGW")-Control plane function ("PGW-C") 720, Policy Control Function ("PCF")/Policy Charging and Rules Function ("PCRF") 725, Application Function ("AF") 730, UPF/PGW-User plane function ("PGW-U") 735, HSS/UDM 740, Authentication Server Function ("AUSF") 745, Data Network ("DN") 750, one or more clusters 113 (which may each include one or more nodes 115), and orchestration system 101. While not explicitly shown in this figure, one or more of the illustrated devices, systems, functions, etc., may be implemented by one or more nodes 109.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710 and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 701 may send traffic to and/or receive traffic (e.g., user plane traffic) from DN 750 via RAN 710 and UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, an LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 517, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, and/or to perform other operations. In some embodiments, the 5G network may include multiple AMFs 715, which communicate with each other via the N14 interface (denoted in FIG. 7 by the line marked "N14" originating and terminating at AMF 715).

SGW 517 may include one or more devices, systems, VNFs, etc., that aggregate traffic received from one or more eNBs 713 and send the aggregated traffic to an external network or device via UPF/PGW-U 735. Additionally, SGW 517 may aggregate traffic received from one or more UPF/PGW-Us 735 and may send the aggregated traffic to one or more eNBs 713. SGW 517 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Cluster 113 may include one or more nodes 115. As discussed above, a particular node 115 may refer to a discrete set of hardware resources, which may include "bare metal" hardware resources and/or virtualized hardware resources associated with one or more physical devices (e.g., server devices). A particular node 115 may also be referred to as a "cloud" device or system, a distributed system, or the like. A particular cluster 113 may refer to a particular set of nodes 115, where different clusters 113 refer to different sets of nodes 115. For example, one cluster 113 may be designated as a cluster of candidate nodes for provisioning FAC 117, where other clusters 113 may not be evaluated as a candidate for the provisioning of FAC 117 (e.g., may be designated for other purposes).

Orchestration system 101 may include one or more devices, systems, VNFs, etc., that provision systems, functions, etc. on one or more nodes, such as a node 109 that implements UPF/PGW-U 735, a node 109 that implements capture component 111, one or more nodes 115 of cluster 113, etc. For example, orchestration system 101 may communicate, via an API (e.g., the Kubernetes API), with nodes 109 and/or 115 to configure and/or provision resources (e.g., bare metal resources or virtualized resources) of nodes 109 and/or 115. As described herein, orchestration system 101 may include, and/or may be communicatively coupled to, one or more repositories (not explicitly shown here), which may provide information used by orchestration system 101 when selecting a particular node 115 for the filtering and analysis of data captured from a node 109, on which capture component 111 is installed.

Figure 8:
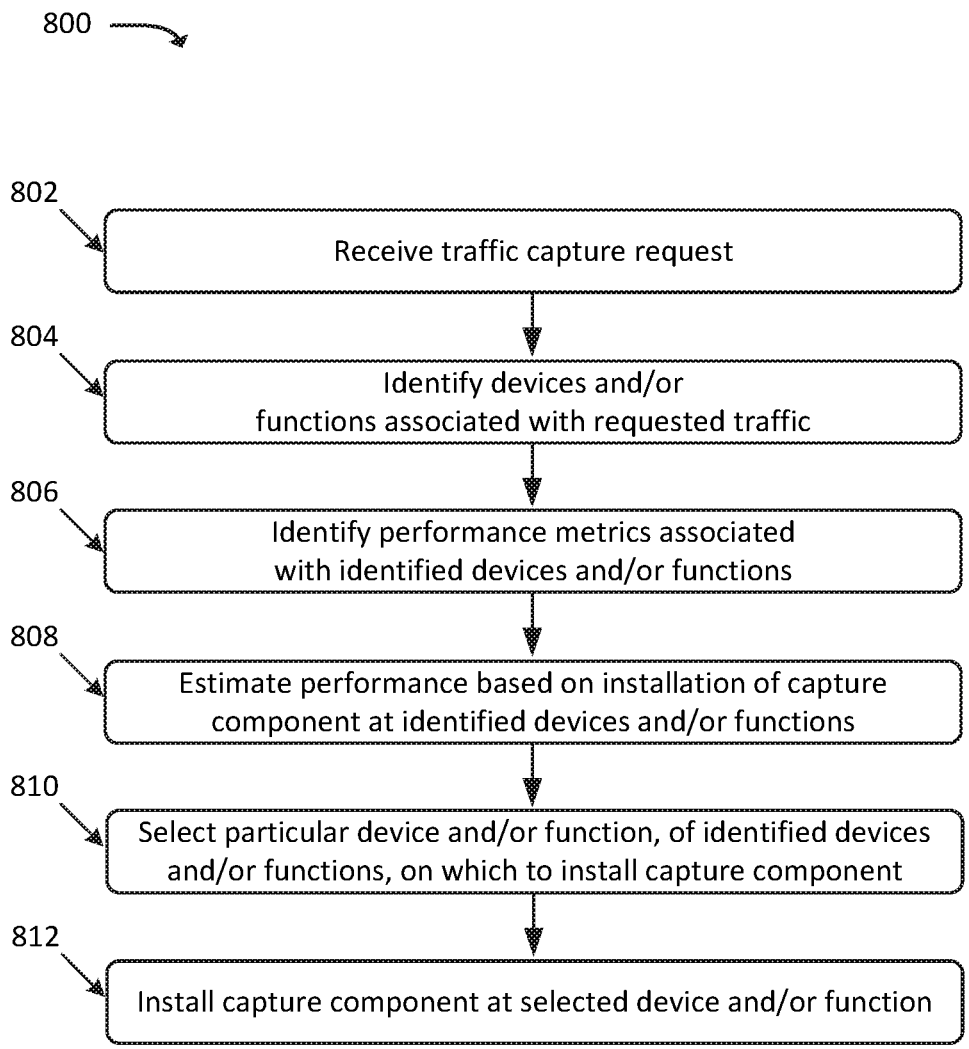
FIG. 8 illustrates an example process for instantiating a capture component at a selected device and/or function, in accordance with some embodiments.

FIG. 8 illustrates an example process 800 for instantiating or installing a capture component at a selected device and/or function. In some embodiments, some or all of process 800 may be performed by orchestration system 101. In some embodiments, one or more other devices may perform some or all of process 800 (e.g., in concert with, and/or in lieu of, orchestration system 101).

As shown, process 800 may include receiving (at 802) a traffic capture request. For example, orchestration system 101 may receive a request to capture traffic matching certain attributes, parameters, and/or other criteria. For example, the request may specify one or more SLAs, one or more subscribers and/or devices, one or more traffic types, and/or other differentiating descriptors of traffic. In some embodiments, orchestration system 101 may communicate with one or more devices or functions to determine one or more SLAs associated with the requested traffic. For example, if the request specifies a given traffic type and/or subscriber, orchestration system 101 may query a repository or other source that maintains a mapping between traffic types and/or subscribers and one or more SLAs. As another example, orchestration system 101 may query a repository or other source that maintains a mapping between traffic types and/or subscribers and one or more network slices, and/or may query a repository or other source that maintains a mapping between network slices and SLAs.

Process 800 may further include identifying (at 804) one or more devices or functions associated with the requested traffic. For example, orchestration system 101 may identify one or more network slices associated with the requested traffic and may identify that a device or function associated with the identified network slice (e.g., as opposed to functions of other network slices) is associated with the traffic. As another example, orchestration system 101 may identify that a device or function that handles user plane traffic (e.g., as opposed to control plane traffic) should be identified as a device or function at which to instantiate or install a capture component to initiate the capture of the requested traffic. In some embodiments, orchestration system 101 may by default identify a UPF (and/or a device or function that performs the same or similar functions of a UPF, such as UPF/PGW-U 735) for installation of the capture component. In some embodiments, orchestration system 101 may identify another device or function, such as a router, hub, switch, etc., which handles the requested traffic. The devices and/or functions (identified at block 804) may be a set of candidate devices or functions, from which orchestration system 101 may ultimately (e.g., as described below) install capture component 111.

Process 800 may additionally include identifying (at 806) performance metrics associated with the identified devices or functions. For example, orchestration system 101 may monitor, on an ongoing basis, performance metrics associated with the identified devices or functions. Additionally, or alternatively, orchestration system 101 may monitor performance metrics (such as processor load and/or capacity, memory load and/or capacity, storage load and/or capacity, traffic latency, traffic throughput, etc.) associated with one or more nodes 109 that implement the identified devices or functions. Orchestration system 101 may, for instance, perform a diagnostic test to determine the performance metrics, and/or may maintain information (which may be updated on an ongoing, periodic, or intermittent basis) indicating the performance metrics associated with the identified devices or functions. In some embodiments, orchestration system 101 may determine an amount of traffic handled by the identified devices or functions over a given period of time (e.g., a measure of throughput, such as average, median, etc., throughput associated with the identified devices or functions).

Process 800 may also include estimating (at 808) performance metrics based on the installation of a capture component at the identified devices or functions. For example, orchestration system 101 may simulate and/or otherwise estimate performance of a given identified device or function if capture component 111 were installed at the given device or function. This estimation may be based on, for example, the amount or throughput of traffic currently handled by the device or system. Generally speaking, the more traffic handled by the device or system, the greater the impact of installing capture component 111 at the device or system may be.

Process 800 may further include selecting (at 810) a particular device or function, of the identified devices or functions, on which to install the capture component. For example, orchestration system 101 may identify a device or function that has the least estimated performance impact if capture component 111 were installed. Additionally, or alternatively, orchestration system 101 may identify a device or system for which the estimated performance impact of installing capture component 111 may be less than a threshold impact, and/or for which the estimated performance after capture component 111 is installed is at least a threshold measure of performance.

Process 800 may additionally include installing (at 812) the capture component at the selected device or function. For example, orchestration system 101 may issue a command (e.g., to a node 109 that implements the selected device or function) to install capture component 111 at the selected device or system. In some embodiments, orchestration system 101 may provide a container, virtual machine, etc., that includes capture component 111. As discussed below, capture component 111 may include functionality to generate, store, output, etc., a copy of traffic handled by (e.g., input and/or output by) the selected device or function. In some embodiments, capture component 111 may be configurable to provide the copy of the traffic to FAC 117, which may be installed at node 109 and/or at a different node (e.g., a particular node 115 of a cluster 113 of candidate nodes 115).

Figure 9:
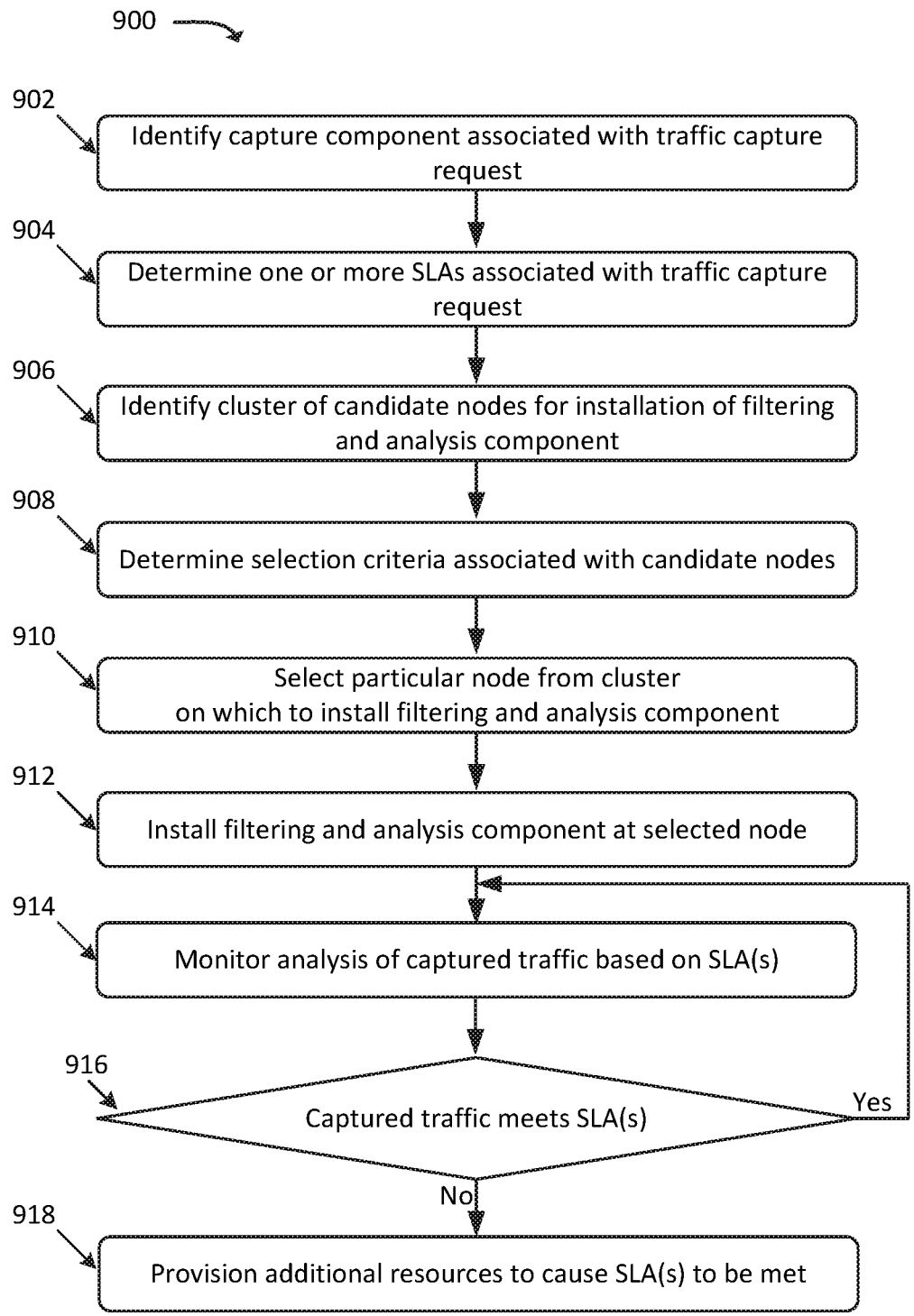
FIG. 9 illustrates an example process for selecting and instantiating a FAC on a suitable node, in accordance with some embodiments.

FIG. 9 illustrates an example process 900 for selecting and installing a FAC on a suitable node, in accordance with some embodiments. In some embodiments, some or all of process 900 may be performed by orchestration system 101. In some embodiments, one or more other devices may perform some or all of process 900 (e.g., in concert with, and/or in lieu of, orchestration system 101).

As shown, process 900 may include identifying (at 902) a capture component 111 associated with a traffic capture request. For example, orchestration system 101 may identify capture component 111, which was installed at a given node 109 (e.g., node 109 that implements a device or function that handles captured traffic, such as UPF/PGW-U 735). Orchestration system 101 may identify addressing information and/or other suitable information that allows one or more other devices or systems to communicate with capture component 111. For example, orchestration system 101 may identify an IP address, a URL, an API-specific name or identifier, and/or other suitable information that may allow FAC 117 to communicate with capture component 111 (e.g., to receive captured traffic from capture component 111).

Process 900 may further include determining (at 904) one or more SLAs associated with the traffic capture request. For example, as discussed above, a traffic capture request may explicitly include one or more SLAs, and/or may include information based on which orchestration system 101 may identify the one or more SLAs associated with the traffic capture request.

Process 900 may additionally include identifying (at 906) a cluster 113 of candidate nodes 115 for the installation of FAC 117. For example, cluster 113 may be a designated set of nodes 115, which may be available for installation of FAC 117 and/or other functions. In some embodiments, different clusters 113 may be designated for different functions, and/or for different network slices. Thus, in some embodiments, orchestration system 101 may select a particular cluster 113 that is associated with a same network slice as a network slice on which capture component 111 is installed. In some embodiments, different clusters 113 may be associated with different geographical regions, and orchestration system 101 may select a closest cluster 113 based on a geographical location or region associated with capture component 111 (e.g., a geographical region in which node 109, on which capture component 111 is installed, is located).

Process 900 may also include determining (at 908) selection criteria associated with the candidate nodes 115. For example, as described above with respect to FIGS. 2-6B, such selection criteria may include (but may not be limited to) geographical distance of candidate nodes 115 to capture component 111 (e.g., to a node 109 that implements capture component 111), performance metrics of links between nodes 115 to capture component 111, network topology associated with nodes 115 and capture component 111, performance metrics associated with nodes 115 (e.g., current or estimated future load, and/or current or estimated future capacity), and/or SLA(s) associated with the requested traffic.

Process 900 may further include selecting (at 910) a particular node 115, from cluster 113, on which to install FAC 117. For example, orchestration system 101 may select a particular node 115 based on the selection criteria discussed above. As similarly discussed above, selecting particular node 115 may also include determining or estimating performance metrics of node 115 if FAC 117 is installed at node 115. For example, orchestration system 101 may determine that FAC 117 should not be installed at a particular node 115 if installing FAC 117 at node 115 would cause performance of node 115 to fall below a threshold performance, and/or if node 115 does not have suitable resources to implement FAC 117. On the other hand, orchestration system 101 may determine that FAC 117 may be installed at node 115 if installing FAC 117 at node 115 would not cause performance of node 115 to fall below a threshold performance, and/or if node 115 has suitable resources to implement FAC 117.

Process 900 may additionally include installing (at 912) FAC 117 at the selected particular node 115. For example, orchestration system 101 may provide a container, virtual image, etc., to selected node 115, which includes FAC 117. In some embodiments, if node 115 already has an instance of FAC 117 installed and/or executing, orchestration system 101 may provide configuration information to FAC 117 to cause FAC 117 to communicate with capture component 111.

Orchestration system 101 may provide, to FAC 117, addressing information to enable FAC 117 to communicate with capture component 111. Additionally, or alternatively, orchestration system 101 may provide addressing information to capture component 111, to enable communications between orchestration system 101 and FAC 117. Orchestration system 101 may also provide parameters of the requested traffic (e.g., traffic type, subscriber and/or device identifier, etc.) to FAC 117, to facilitate the filtering of the requested traffic. FAC 117 may, accordingly, filter the requested traffic (e.g., discard traffic received from capture component 111, which does not match the parameters of the requested traffic).

Process 900 may also include monitoring (at 914) the analysis of the captured traffic based on the SLA(s) associated with the requested traffic. For example, orchestration system 101 and/or FAC 117 may analyze the filtered traffic (e.g., on an ongoing, periodic, or intermittent basis) to determine whether one or more SLAs associated with the requested traffic are met.

Process 900 may further include determining (at 916) whether the SLA(s) are met by the monitored traffic. If the SLA(s) is/are met (at 916—YES), then orchestration system 101 may continue to monitor (at 914) the filtered traffic to determine whether the SLA(s) is/are met. If, on the other hand, one or more of the SLAs are not met (at 916—NO), then process 900 may include provisioning (at 918) additional resources to cause the SLA(s) to be met. For example, orchestration system 101 may provision additional resources at one or more nodes that handle the traffic (e.g., node 109 that implements a UPF and/or other suitable device or function, such as UPF/PGW-U 735).

In some embodiments, the resources to be provisioned may be based on the SLA(s) that is/are not met, and/or based on capacity and/or load of devices and/or functions that handle the traffic (and/or of nodes that implement the devices or functions). For example, if particular traffic is being handled by UPF/PGW-U 735 which does not meet a maximum latency specified in an SLA associated with the particular traffic, and a node 109 that implements UPF/PGW-U 735 has available processor and/or memory resources, orchestration system 101 may provision additional processor and/or memory resources of node 109 for UPF/PGW-U 735. Additionally, or alternatively, orchestration system 101 may generate and/or output an alert, indicating that the SLA associated with the particular traffic is not being met. This alert may allow an administrator and/or other individual to quickly identify network issues and/or events and remediate such issues.

Figure 10:
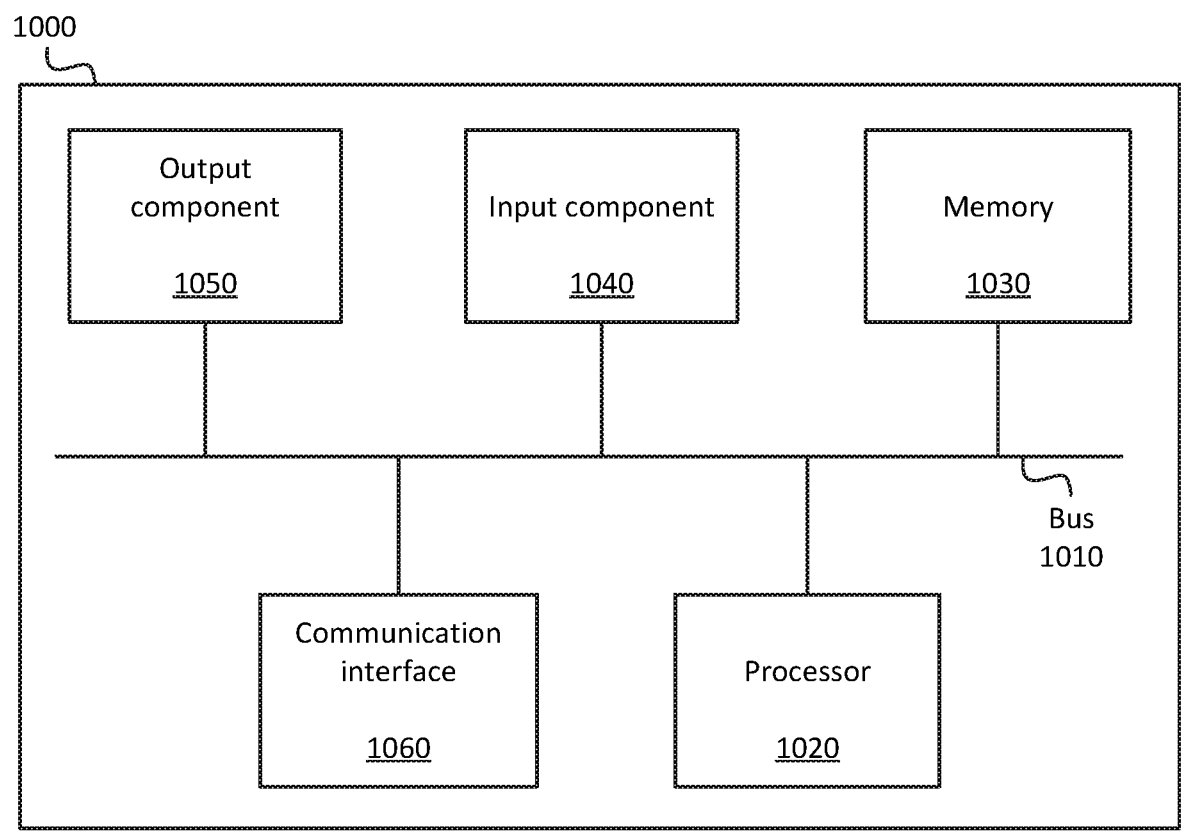
FIG. 10 illustrates example functional components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1C, 8, and 9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   one or more processors configured to:
   receive a request to capture traffic, the request indicating one or more attributes of the requested traffic;
   identify a first set of devices that handle traffic that includes the requested traffic;
   instantiate, at the first set of devices, a capture component that is configured to forward a copy of the traffic handled by the first set of devices to a filtering and analysis component;
   select, from a cluster that includes a plurality of sets of devices, a second set of devices at which to instantiate the filtering and analysis component, the selecting being based on load or capacity associated with each set of devices, of the sets of devices of the plurality of sets of devices;
   instantiate, at the selected second set of devices, the filtering and analysis component;
   configure the filtering and analysis component based on the one or more attributes of the selected traffic, wherein configuring the filtering and analysis component causes the filtering and analysis component to:
   receive the copy of the traffic from the capture component,
   store and/or output a subset of the copy of the traffic that matches the one or more attributes of the requested traffic, and
   discard the remaining traffic, of the copy of the traffic, that does not match the one or more attributes of the requested traffic.

2. The system of claim 1, wherein selecting the second set of devices includes:
   identifying a geographical location associated with the first set of devices;
   identifying a geographical location associated with each set of devices, of the plurality of sets of devices; and
   selecting the second set of devices, from the plurality of sets of devices, based on the geographical locations associated with the first set of devices and with each set of devices, of the plurality of sets of devices.

3. The system of claim 1, wherein selecting the second set of devices includes:
   identifying performance metrics between the first set of devices and each set of devices of the plurality of sets of devices; and
   selecting the second set of devices, from the plurality of sets of devices, based on the performance metrics between the first set of devices and each set of devices of the plurality of sets of devices.

4. The system of claim 3, wherein the performance metrics, between the first set of devices and the second set of devices, include at least one of:
   latency of traffic between the first set of devices and the second set of devices, or
   throughput of traffic between the first set of devices and the second set of devices.

5. The system of claim 1, wherein selecting the second set of devices includes:
   identifying a network topology between the first set of devices and each set of devices of the plurality of sets of devices; and
   selecting the second set of devices, from the plurality of sets of devices, based on the network topology between the first set of devices and each set of devices of the plurality of sets of devices.

6. The system of claim 1, wherein the first set of devices is a first node in virtualized environment, and wherein the second set of devices is a second node in the virtualized environment.

7. The system of claim 1, wherein the one or more attributes of the requested traffic indicates one or more Service Level Agreements ("SLAs"), wherein selecting the second set of devices is further based on the one or more SLAs associated with the requested traffic.

8. A non-transitory computer-readable medium, storing a plurality of processor-executable instructions to:
   receive a request to capture traffic, the request indicating one or more attributes of the requested traffic;
   identify a first set of devices that handle traffic that includes the requested traffic;
   instantiate, at the first set of devices, a capture component that is configured to forward a copy of the traffic handled by the first set of devices to a filtering and analysis component;
   select, from a cluster that includes a plurality of sets of devices, a second set of devices at which to instantiate the filtering and analysis component, the selecting being based on load or capacity associated with each set of devices, of the sets of devices of the plurality of sets of devices;
   instantiate, at the selected second set of devices, the filtering and analysis component;
   configure the filtering and analysis component based on the one or more attributes of the selected traffic, wherein configuring the filtering and analysis component causes the filtering and analysis component to:
   receive the copy of the traffic from the capture component,
   store and/or output a subset of the copy of the traffic that matches the one or more attributes of the requested traffic, and
   discard the remaining traffic, of the copy of the traffic, that does not match the one or more attributes of the requested traffic.

9. The non-transitory computer-readable medium of claim 8, wherein selecting the second set of devices includes:
   identifying a geographical location associated with the first set of devices;
   identifying a geographical location associated with each set of devices, of the plurality of sets of devices; and
   selecting the second set of devices, from the plurality of sets of devices, based on the geographical locations associated with the first set of devices and with each set of devices, of the plurality of sets of devices.

10. The non-transitory computer-readable medium of claim 8, wherein selecting the second set of devices includes:
identifying performance metrics between the first set of devices and each set of devices of the plurality of sets of devices; and
selecting the second set of devices, from the plurality of sets of devices, based on the performance metrics between the first set of devices and each set of devices of the plurality of sets of devices.

11. The non-transitory computer-readable medium of claim 10, wherein the performance metrics, between the first set of devices and the second set of devices, include at least one of:
latency of traffic between the first set of devices and the second set of devices, or
throughput of traffic between the first set of devices and the second set of devices.

12. The non-transitory computer-readable medium of claim 8, wherein selecting the second set of devices includes:
identifying a network topology between the first set of devices and each set of devices of the plurality of sets of devices; and
selecting the second set of devices, from the plurality of sets of devices, based on the network topology between the first set of devices and each set of devices of the plurality of sets of devices.

13. The non-transitory computer-readable medium of claim 8, wherein the first set of devices is a first node in virtualized environment, and wherein the second set of devices is a second node in the virtualized environment.

14. The non-transitory computer-readable medium of claim 8, wherein the one or more attributes of the requested traffic indicates one or more Service Level Agreements ("SLAs"), wherein selecting the second set of devices is further based on the one or more SLAs associated with the requested traffic.

15. A method, comprising:
receiving a request to capture traffic, the request indicating one or more attributes of the requested traffic;
identifying a first set of devices that handle traffic that includes the requested traffic;
instantiating, at the first set of devices, a capture component that is configured to forward a copy of the traffic handled by the first set of devices to a filtering and analysis component;
selecting, from a cluster that includes a plurality of sets of devices, a second set of devices at which to instantiate the filtering and analysis component, the selecting being based on load or capacity associated with each set of devices, of the sets of devices of the plurality of sets of devices;
instantiating, at the selected second set of devices, the filtering and analysis component;
configuring the filtering and analysis component based on the one or more attributes of the selected traffic, wherein configuring the filtering and analysis component causes the filtering and analysis component to:
receive the copy of the traffic from the capture component,
store and/or output a subset of the copy of the traffic that matches the one or more attributes of the requested traffic, and
discard the remaining traffic, of the copy of the traffic, that does not match the one or more attributes of the requested traffic.

16. The method of claim 15, wherein selecting the second set of devices includes:
identifying a geographical location associated with the first set of devices;
identifying a geographical location associated with each set of devices, of the plurality of sets of devices; and
selecting the second set of devices, from the plurality of sets of devices, based on the geographical locations associated with the first set of devices and with each set of devices, of the plurality of sets of devices.

17. The method of claim 15, wherein selecting the second set of devices includes:
identifying performance metrics between the first set of devices and each set of devices of the plurality of sets of devices, wherein the performance metrics, between the first set of devices and the second set of devices, include at least one of:
latency of traffic between the first set of devices and the second set of devices, or
throughput of traffic between the first set of devices and the second set of devices; and
selecting the second set of devices, from the plurality of sets of devices, based on the performance metrics between the first set of devices and each set of devices of the plurality of sets of devices.

18. The method of claim 15, wherein selecting the second set of devices includes:
identifying a network topology between the first set of devices and each set of devices of the plurality of sets of devices; and
selecting the second set of devices, from the plurality of sets of devices, based on the network topology between the first set of devices and each set of devices of the plurality of sets of devices.

19. The method of claim 15, wherein the first set of devices is a first node in virtualized environment, and wherein the second set of devices is a second node in the virtualized environment.

20. The method of claim 15, wherein the one or more attributes of the requested traffic indicates one or more Service Level Agreements ("SLAs"), wherein selecting the second set of devices is further based on the one or more SLAs associated with the requested traffic.

* * * * *